United States Patent
Wolfe et al.

[11] Patent Number: 6,116,608
[45] Date of Patent: Sep. 12, 2000

[54] APPARATUS FOR GUIDING SOLID PARTICLES THROUGH A BRUSH SEAL IN A TURBINE

[75] Inventors: Christopher Edward Wolfe, Niskayuna; Martin Francis O'Connor, Schenectady; Mehmet Demiroglu, Troy; Lawrence Edward Rentz, Clifton Park; Frederick George Baily, Ballston Spa, all of N.Y.

[73] Assignee: General Electric Co., Schenectady, N.Y.

[21] Appl. No.: 09/189,919

[22] Filed: Nov. 12, 1998

[51] Int. Cl.$^7$ .................................................. F16J 15/447
[52] U.S. Cl. .............................................................. 277/355
[58] Field of Search ........................ 277/355; 415/174.2, 415/173.3, 230

[56] References Cited

U.S. PATENT DOCUMENTS

| | | | |
|---|---|---|---|
| 4,971,336 | 11/1990 | Ferguson . | |
| 5,110,033 | 5/1992 | Noone et al. . | |
| 5,201,530 | 4/1993 | Kelch et al. . | |
| 5,400,952 | 3/1995 | Hetico et al. | 277/355 |
| 5,529,113 | 6/1996 | Borowy | 277/355 |
| 5,630,590 | 5/1997 | Bouchard et al. . | |
| 5,749,584 | 5/1998 | Skinner et al. . | |
| 5,961,280 | 10/1999 | Turnquist et al. | 277/355 |
| 6,032,959 | 3/2000 | Carter | 277/355 |

FOREIGN PATENT DOCUMENTS

| | | |
|---|---|---|
| 3-209068 | 9/1991 | Japan . |
| WO 92/05378 | 3/1992 | WIPO . |

*Primary Examiner*—Anthony Knight
*Assistant Examiner*—Enoch E. Peavey
*Attorney, Agent, or Firm*—Nixon & Vanderhye

[57] ABSTRACT

A brush seal is mounted between rotary and stationary components in a flow stream having solid particles. A gap is formed through the brush seal bristles and a deflector plate is disposed to catch and deflect solid particles on the upstream side of the brush seal to direct the particles through the gap to the downstream side of the brush seal. In this manner, the solid particles of the flow stream do not erode or otherwise deteriorate the brush seal bristles or ancillary parts of the brush seal. The deflector plates may be directed axially upstream, at an angle to a plane passing through the brush seal or may comprise an arcuate configuration directed upstream.

13 Claims, 3 Drawing Sheets

APPARATUS FOR GUIDING SOLID PARTICLES THROUGH A BRUSH SEAL IN A TURBINE

TECHNICAL FIELD

The present invention relates generally to brush seals for use in a turbine and particularly relates to apparatus for minimizing or eliminating solid particle erosion damage in a turbine utilizing brush seals, for example, between the stationary shrouds and bucket covers of the rotating component of the turbine.

BACKGROUND OF THE INVENTION

In steam turbines, solid particle erosion damage to both stationary and rotating components in the steam path is a significant problem. The problem is exacerbated as the average in-service age of a steam turbine increases. A principal source of such erosion damage is the existence of iron oxide particles in the steam resultant from the exfoliation of oxides formed on the inner surfaces of the steam boiler tubes and steam piping at elevated temperatures and which particles impact on the nozzles and buckets along the steam path. Solid particle erosion damage in steam turbines in general is a major contributor to problems associated with operation and maintenance of steam turbines, for example those used by utilities to generate electrical power. These problems include loss of sustained efficiency, forced outages, extended maintenance outages, cost of maintenance, cost of replacement parts and shortened inspection intervals.

Solid particles are prevalent during start up of the steam turbine particularly at bucket tip locations in the early stages of the high and intermediate pressure sections of the turbine. Significant erosion damage can occur as these particles work their way down the turbine. Damage typically occurs to the bucket cover, the seals for which are typically labyrinth seals, as well as to the diaphragm, nozzle and bucket airfoils. When brush seals are used as bucket tip seals either alone or in combination with labyrinth type seals, solid particle erosion upstream of the seal can become more severe as solid particles are not able to pass through the brush seal as easily as they pass through a labyrinth seal. Additionally, the solid particles become entrapped in the interstices of the bristles and/or between the bristle pack and the upstream backing plate. This can lead to further damage to the brush seal and other parts of the turbine.

A variety of different designs have been proposed and utilized to reduce solid particle erosion in the steam path of a turbine, particularly in areas of the turbine other than seals. For example various coatings have been applied to the buckets and nozzle partitions. However, bucket tip labyrinth seal designs generally have not been altered to reduce solid particle erosion as it has been assumed that particles will eventually flow through the labyrinth seals. However, because brush seals typically have tips which lie close to or engage the rotating component, solid particles may be precluded from readily passing through the brush seal and will become trapped in upstream areas of the bucket or shroud or in the bristles per se leading to damage to the turbine. Accordingly, there is a need to design a brush seal which will alleviate the solid particle erosion problem in connection with brush seals, particularly those used in steam turbines.

BRIEF SUMMARY OF THE INVENTION

In accordance with the present invention, there is provided a brush seal between a stationary component and a rotatable component in a turbine, for example, between the stationary seal arrangement and bucket covers of a steam turbine or between the stationary component and a movable turbine component such as the rotor shaft. Typically, a brush seal is formed of a plurality of arcuate segments disposed in a stationary component about a rotatable component with the bristles of the brush seal extending at an angle to a radius and in the direction of rotation of the rotatable component. The brush seal is typically formed in two or more segments to facilitate installation of the seal and other requirements, for example, two brush seal segments having their joints along the horizontal midline of the turbine to facilitate opening the turbine. It will be appreciated in the present invention that the brush seal can be utilized alone as the sole seal between the stationary and rotating components, or may be used in conjunction with other seals such as labyrinth seals.

In a typical preferred embodiment of the present invention, the brush seal is provided in segments and includes a pair of backing plates on opposite sides of the brush bristles, the bristles projecting from the radially inner edges of the backing plates typically for engagement with the rotatable component, e.g. the bucket covers. In accordance with this invention, at least one gap or passageway is formed through the brush seal to enable solid particles entrained in the steam flow to pass from the upstream side of the brush seal through the seal to the downstream side thereof. Particularly, the gap or passageway may be formed through a portion of the brush seal segment between its ends or may be formed at adjoining ends of adjacent segments. Additionally, a guide is provided on the brush seal for guiding the solid particles into the passageway defined by the gap in the brush seal. That is, the guide projects from the brush seal in a generally upstream direction to catch the solid particles, which generally have axial and circumferential flow components. Because of the circumferential flow component, the guide catches and directs particles through the passageway to the downstream side of the brush seal. The guide may comprise a flat plate projecting axially upstream from the brush seal and lies on the downstream side of the gap from a rotation point of view or passageway through the brush seal to catch at least the solid particles having a circumferential component of the flow. In another form, the guide may be angled relative to the brush seal in an upstream direction and toward oncoming solid particles. As a further alternative, the guide may be curved in the upstream direction and toward the upstream direction of the circumferential component of the flow of the solid particles. The guides can number as few as one about the entire circumference of the brush seal, or may be provided on each segment. Preferably, two guides are provided at the horizontal split line of the turbine casing.

In a preferred embodiment according to the present invention, there is provided a brush seal for sealing between a rotary component and non-rotary component having a flow passage therebetween for a flow stream having axial and circumferential flow components comprising a brush seal body including an arcuate array of a plurality of bristles projecting from the non-rotary component toward the rotary component and into the flow passage to form a seal between upstream and downstream portions of the flow passage, the brush seal body having a discrete gap between the bristles for flowing a portion of the flow stream from the upstream portion through the gap to the downstream portion and a guide projecting from the brush seal body toward and into the upstream portion of the flow passage for intercepting the flow stream and directing the flow stream portion through the gap.

In a further preferred embodiment according to the present invention, there is provided in a rotary machine having a rotatable component, a non-rotatable component and a flow passage therebetween, the components lying about a common axis, a seal between the components, comprising a brush seal having an arcuate array of discrete bristles carried by the non-rotatable component and at least one arcuate backing plate, the brush seal having a discrete gap between the bristles defining a passageway for flowing a fluid stream from an upstream side of the seal to the downstream side thereof and a guide carried by the non-rotatable component and projecting in an upstream direction for intercepting a portion of the fluid stream and directing the intercepted fluid stream portion through the passageway.

Accordingly, it is a primary object of the present invention to provide a brush seal between stationary and rotating components of a turbine which facilitates passage of solid particles through the brush seal from the upstream side of the brush seal to its downstream side, thereby minimizing or eliminating solid particle erosion in the brush seal or ancillary components of the turbine.

DETAILED DESCRIPTION OF THE INVENTION

Figure 1:
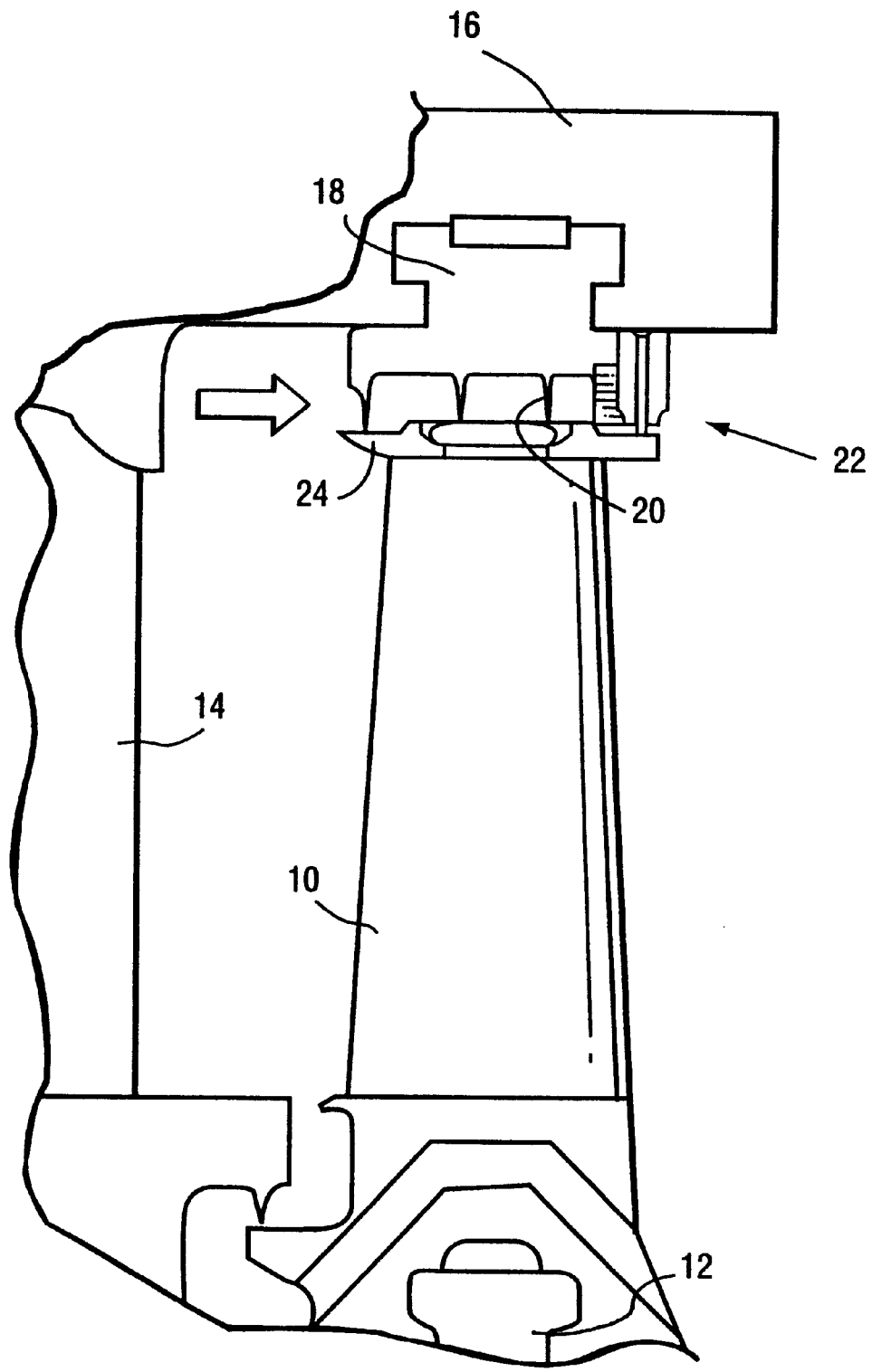
FIG. 1 is a fragmentary elevational view along an axial plane illustrating rotary and stationary components of a turbine employing a brush seal in accordance with the present invention.

Referring now to the drawings, particularly to FIG. 1, there is illustrated a rotary component of a turbine, for example, a turbine bucket 10 mounted on a turbine wheel 12 rotatable about an axis. Also illustrated is a nozzle 14 mounted in a stationary casing 16, also mounting a sealing ring 18. The sealing ring 18 carries a plurality of labyrinth seal teeth 20 in combination with a brush seal, generally designated 22, forming part of the present invention. The brush seal 22 can be used in combination with the labyrinth seals or by itself without the labyrinth seals. As illustrated, the seals 20 and 22 bear against a cover 24 mounted on the tips of the buckets 10, the cover being rotatable with the turbine buckets. It will be appreciated that the nozzle 14 and buckets 10 lie in a flow path for the gas flow stream, for example, steam, flowing through the turbine. As noted previously, the steam may contain solid particles which generally flow downstream through the turbine but which also flow through the leakage paths afforded by the seals between the sealing ring 18 and the bucket cover 24.

Figure 2:
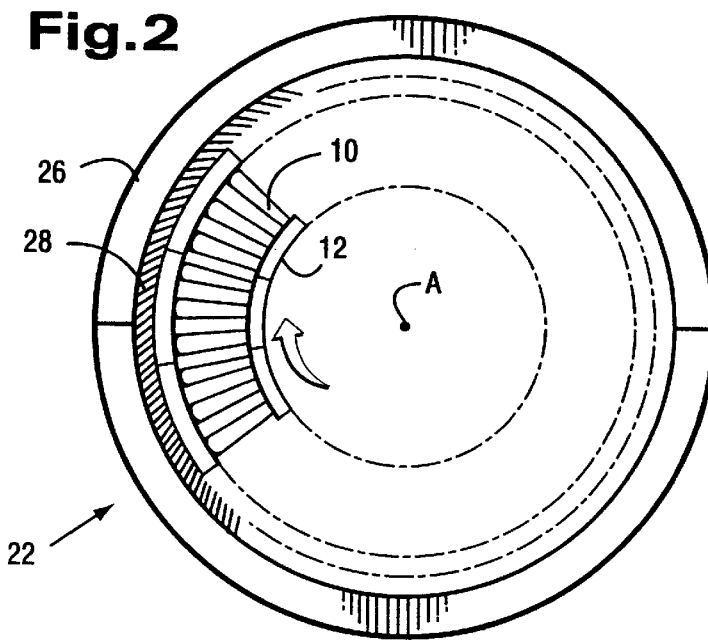
FIG. 2 is a schematic axial elevational view of a rotary component of a turbine with a brush seal according to the present invention.
Figure 3:
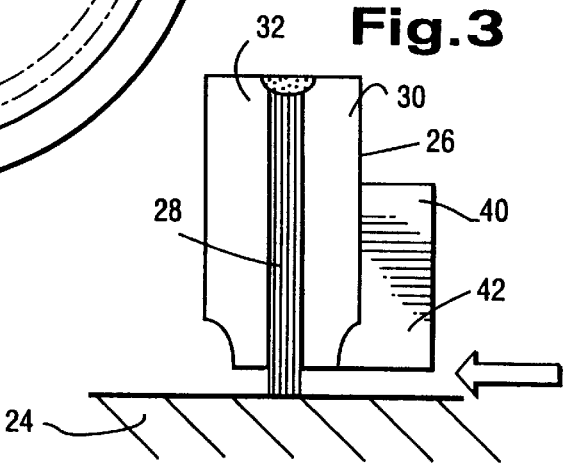
FIG. 3 is an enlarged side elevational view of a brush seal.

In accordance with the present invention, and referring to FIG. 2, the brush seal 22 may comprise two or more arcuate segments 26, each segment constituting a brush seal body mounting a plurality of bristles between a pair of side plates 30 and 32. The bristles may be of the type described and illustrated in U.S. Pat. Nos. 5,749,584 or 5,474,306, of common assignee herewith, the disclosures of which are incorporated herein by reference. As illustrated, the bristles 28 are disposed at an angle relative to the radius from the axis of the rotary component in the direction of rotation of the rotary component relative to the brush seal. For example, the angle of the bristles 28 in FIG. 2 relative to a radius may be seen as approximately in the direction of rotation and may be within a range of about 30°–60°. The bristles are typically welded at their outer ends to one another and to the side plates 30 and 32. From a review of FIG. 3, it will be appreciated that the side plates 30 and 32 extend toward the surface of the rotating component 24 but that their radially inner edges are spaced from it. The tips of the bristles 28 project beyond the extremities of the side plates 30 and 32 to engage or lie very closely spaced from the surface of the rotary component 24.

Figure 4:
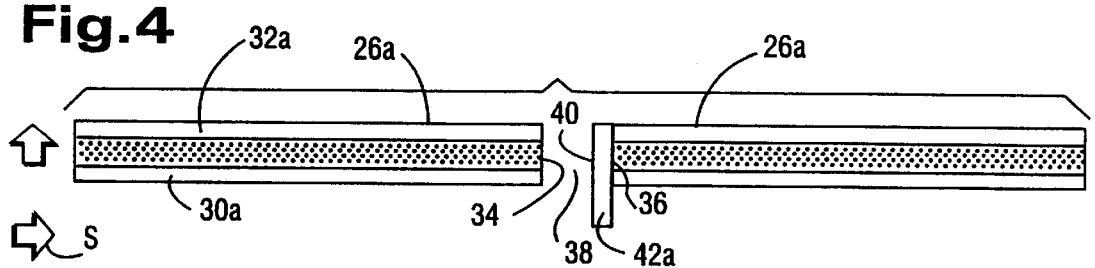
FIGS. 4, 5 and 6 are generally radially outward views of the brush seal hereof with the solid particle guide.

With reference, for example, to a first embodiment of a brush seal hereof illustrated in FIG. 4, wherein like reference numerals refer to like parts as in the previous description, followed by the suffix "a," adjoining ends 34 and 36 of a pair of brush seal segments define a gap 38 therebetween. The gap may be provided between only one of a pair of adjoining ends of any number of the segments and there may only be one gap or a plurality of gaps as well as guides as described below in the brush seal. Adjacent to the gap 38 and secured to one end of a brush seal segment is a guide 40. The guide 40 comprises a deflector plate 42 which projects from the brush seal segment in a generally upstream direction. It will be appreciated that the flow along the flow path has both axial and circumferential components of flow caused by the swirl imparted to the flow stream by the nozzles. The deflector plate 42 is located on the downstream side of the gap 38 with respect to the swirl direction (indicated S in FIGS. 4, 5 and 6) to catch and direct solid particles in the circumferential flow component of the flow stream into the gap 38 such that the particles may pass from the upstream side of the brush seal to the downstream side thereof. When the brush seal is used in combination with the labyrinth seal as illustrated in FIG. 1, the guide 40 projects upstream short of the next-adjacent labyrinth tooth.

Figure 5:
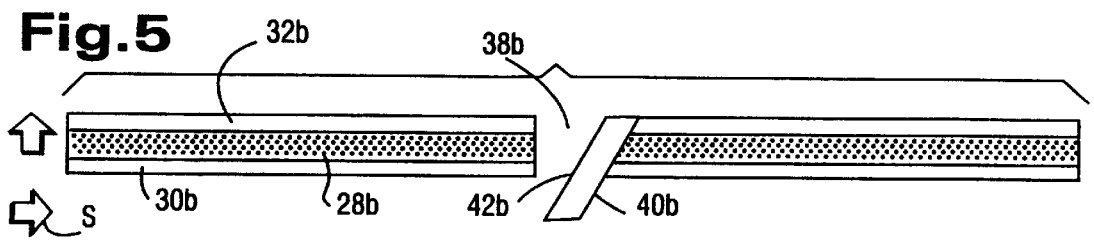

Referring to FIG. 5, there is illustrated two segments of a brush seal body having backing plates 30b and 32b with bristles 28b therebetween. The guide 40b is mounted on one end of a brush seal segment to lie at an angle toward the upstream direction of the circumferential component of the flow. Thus, as in the previous embodiment, the deflector plate 42b deflects solid particles in the circumferential component of flow from the upstream side of the brush seal through the gap 38b to the downstream side of the brush seal.

Figure 6:
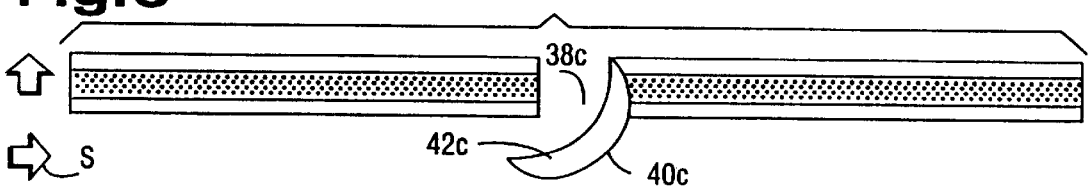

Referring to FIG. 6, the guide 40c may comprise an arcuate deflector plate 42c, again directed generally in the upstream direction of the circumferential flow component. The guide 40c, thus similarly as the previous guides, collects and directs the solid particles in the circumferential component of the flow stream from the upstream side of the brush seal through the gap 38c to the downstream side.

It will be appreciated that the deflector plates can be disposed intermediate the ends of any one or more of the particular brush seal segments. That is, the deflector plates need not always be mounted at the ends of the annular segments but may lie intermediate the ends of the segments as illustrated in FIGS. 7 and 8.

Figure 7:
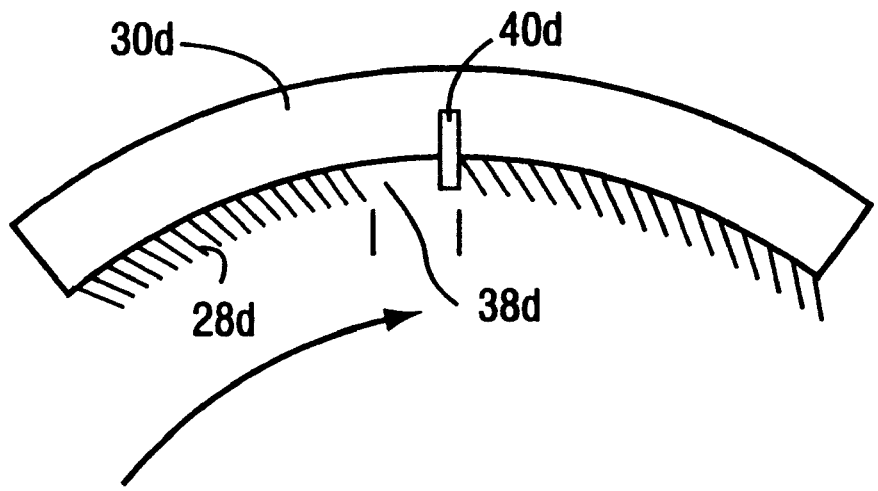
FIGS. 7 and 8 are axial views of segments of a brush seal illustrating further embodiments hereof.

In FIG. 7, the gap 38d through the brush seal segment may be formed through the bristles only without any gap or notch through the side plates. In this form, the guide 40d is carried by a side plate, e.g., plate 30d, for projection on the upstream side of the segment and lies radially inwardly of the inner edges of the side plates terminating short of the tips of the bristles 28d.

Figure 8:
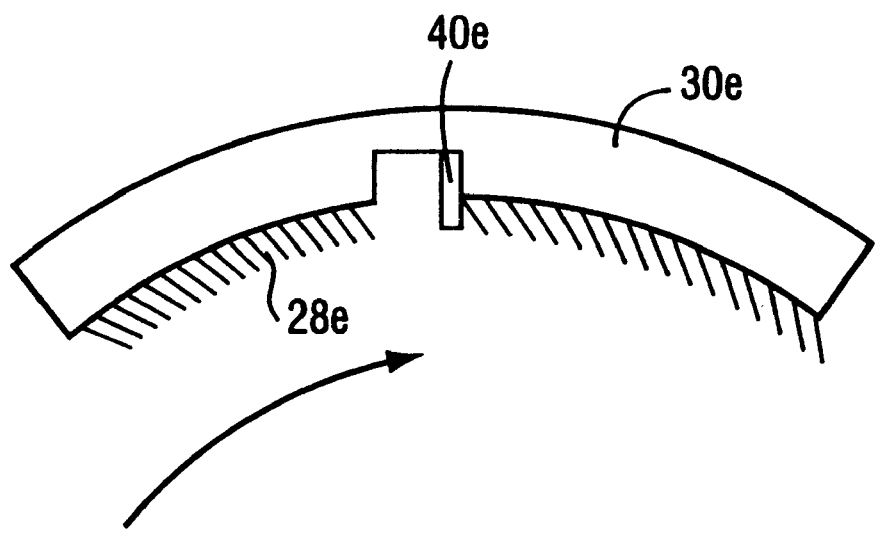

In FIG. 8, the side plates may be notched along radial inner edges thereof and the bristles 28e may be omitted in the notched area. The guide 40e projects upstream from side plate 30e to guide the particles through the notch. It will be appreciated from the foregoing embodiments that the solid particles in the flow stream are thus afforded the opportunity to flow through a gap without being caught or hung up on the brush bristles, the interstices between the brush bristles and between the brush bristles and the side plates.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal for sealing between a rotary component and non-rotary component having a flow passage therebetween for a flow stream having axial and circumferential flow components comprising:

a brush seal body including an arcuate array of a plurality of bristles projecting from the non-rotary component toward the rotary component and into the flow passage to form a seal between upstream and downstream portions of the flow passage, said brush seal body having a discrete gap between said bristles for flowing a portion of the flow stream from the upstream portion through said gap to the downstream portion; and a guide projecting from said brush seal body toward and into said upstream portion of the flow passage for intercepting the flow stream and directing the flow stream portion through said gap.

2. A brush seal according to claim 1 wherein said guide projects in a direction generally at right angles to a plane passing through said brush seal body.

3. A brush seal according to claim 1, wherein said guide projects at an angle to a plane passing through said brush seal body.

4. A brush seal according to claim 1, wherein said guide is arcuate and projects from a plane passing through said brush seal body generally toward an upstream direction.

5. A brush seal according to claim 1 wherein said brush seal body comprises a pair of arcuate segments with respective adjoining ends defining said gap therebetween, each segment including a portion of said arcuate array of said plurality of bristles, said guide projecting from an adjoining end of one of said segments.

6. A brush seal according to claim 5 wherein said guide lies on a downstream side of said gap relative to the circumferential component of flow.

7. A brush seal according to claim 1 wherein said brush seal body comprises a pair of arcuate segments with respective adjoining ends, each segment including a portion of said arcuate array of a plurality of brush bristles, said gap and said guide being located intermediate to the ends of one of said segments.

8. In a rotary machine having a rotatable component, a non-rotatable component and a flow passage therebetween, said components lying about a common axis, a seal between said components, comprising:

a brush seal having an arcuate array of discrete bristles carried by said non-rotatable component and at least one arcuate backing plate;

said brush seal having a discrete gap between said bristles defining a passageway for flowing a fluid stream from an upstream side of said seal to the downstream side thereof; and a guide carried by said non-rotatable component and projecting in an upstream direction for intercepting a portion of the fluid stream and directing the intercepted fluid stream portion through said passageway.

9. A rotary machine according to claim 8, wherein said brush seal includes at least a pair of arcuate segments each including a portion of said array of bristles and a portion of said backing plate, said passageway being located and said guide projecting at a juncture of said segments.

10. A rotary machine according to claim 8, wherein said flow stream on the upstream side of said seal has axial and circumferential components of flow, said guide lying on a downstream side of said passageway relative to said circumferential component of flow for guiding the intercepted fluid stream into said passageway.

11. A rotary machine according to claim 8, wherein said guide projects in a direction generally at right angles to a plane passing through said brush seal.

12. A rotary machine according to claim 8, wherein said guide projects at an angle to a plane passing through said brush seal.

13. A rotary machine according to claim 8, wherein said guide is arcuate and projects generally in an upstream direction.

* * * * *